Dec. 14, 1937. S. C. BOND 2,101,977
MACHINE FOR APPLYING CLOSURES
Filed June 29, 1935 2 Sheets-Sheet 2
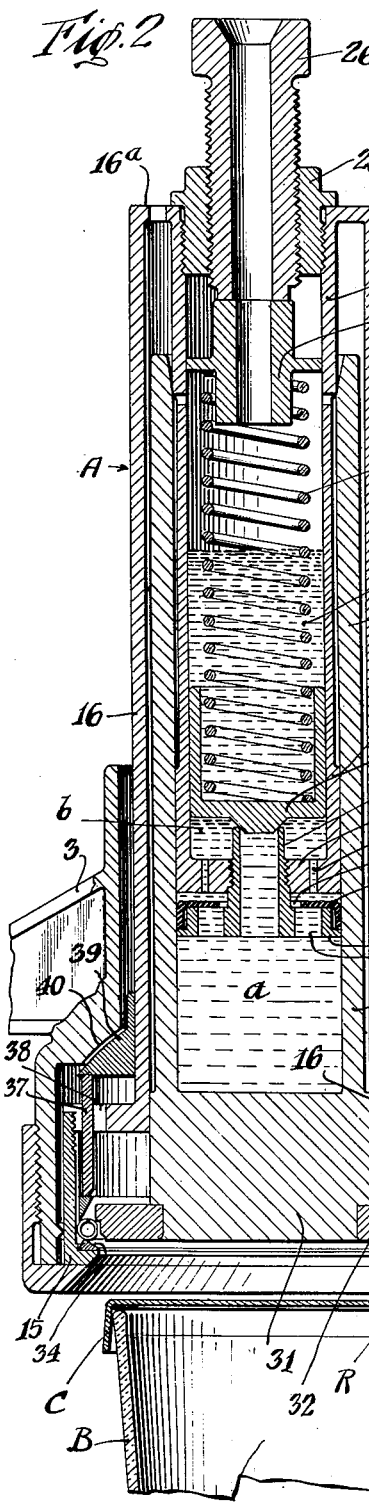
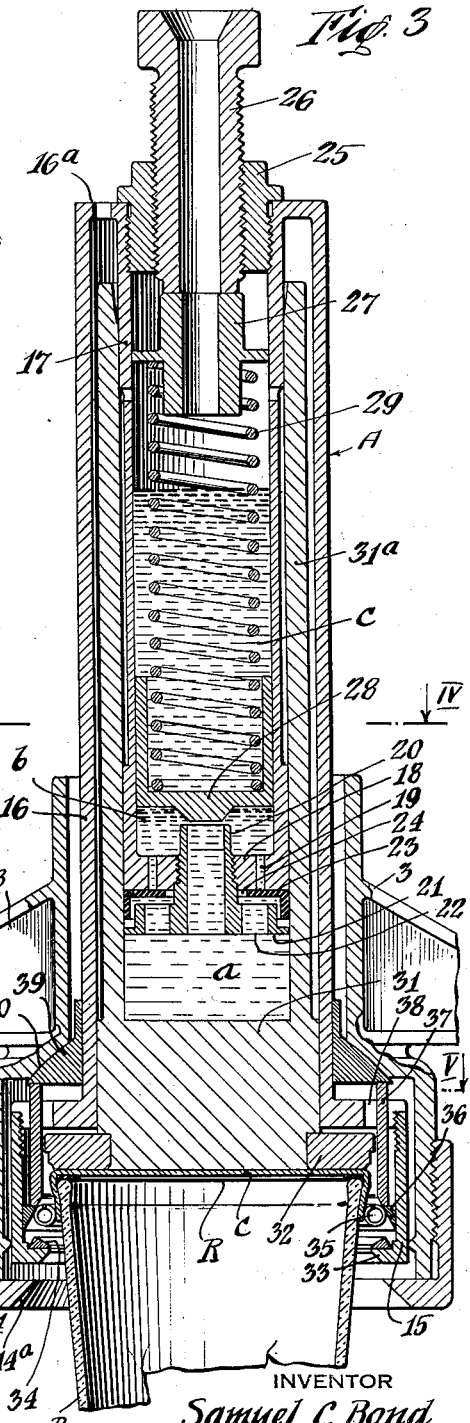
INVENTOR
Samuel C. Bond
BY
Hoguet, Neary & Campbell
ATTORNEYS Patented Dec. 14, 1937

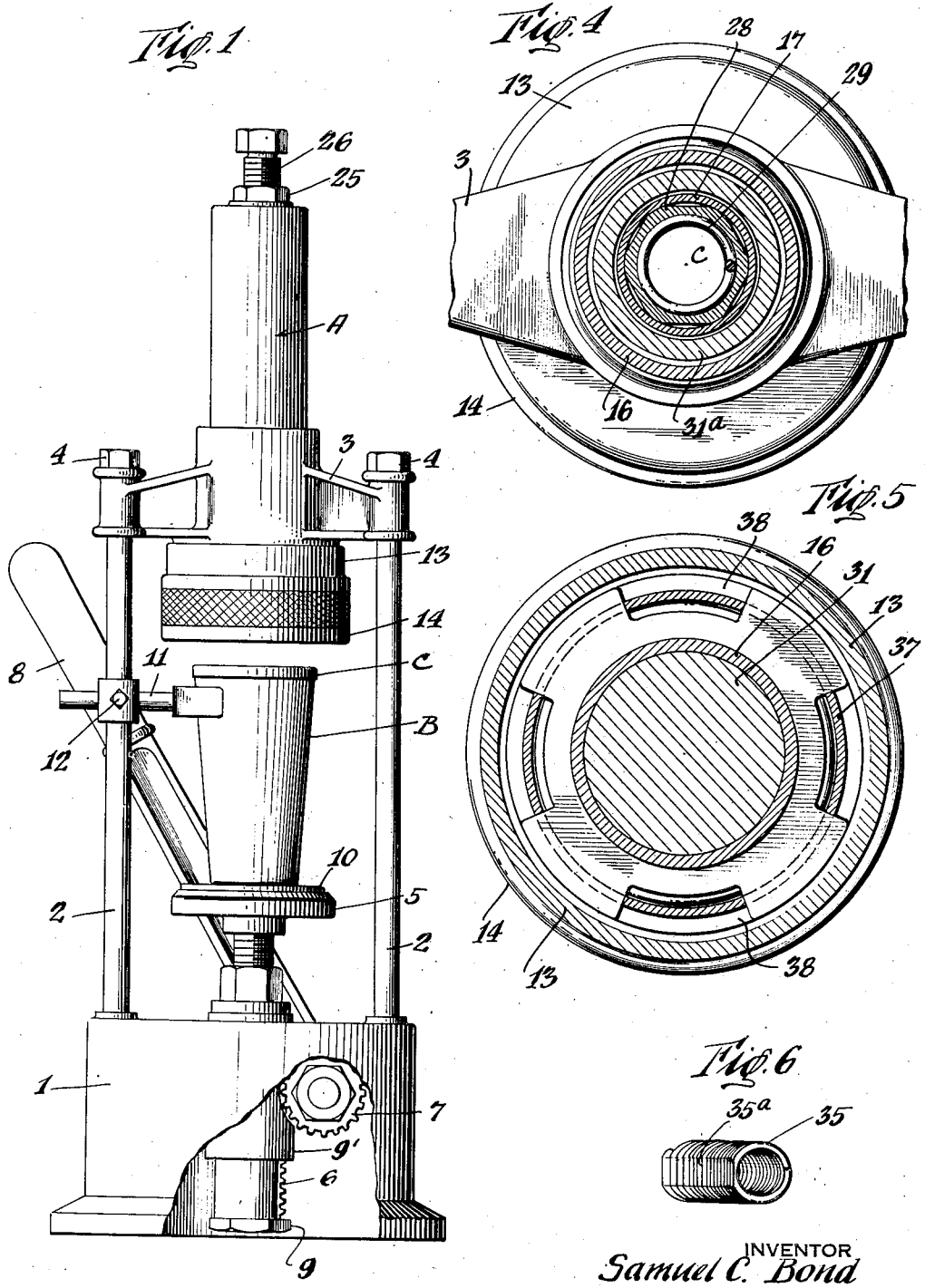

2,101,977

UNITED STATES PATENT OFFICE 2,101,977

MACHINE FOR APPLYING CLOSURES

Samuel C. Bond, Holly Oak, Del.

Application June 29, 1935, Serial No. 29,018

15 Claims. (Cl. 226—86)

This invention relates to a device for applying closures to containers and has particular reference to a device for conforming flanged, thin sheet-metal closures to glass containers.

In the packaging of certain materials in glass containers, particularly food products, it is very desirable to employ a glass container of a size and proportion such that it may be used for serving liquid foods and beverages after the material has been removed therefrom. In order that the container may be suitable and attractive for this subsequent use, it is desirable that it be made of relatively thin glass.

The application of closures to containers made of thin glass presents difficult problems, which are not encountered in the sealing of containers made of heavy glass, for the reason that thin glasses are liable to break under the pressure exerted upon the container by the usual closure apparatus. Thin glasses of a type which are economical to use for containers have many irregularities; they are not all the same height or of the same diameter, and in a single glass the rim may not be exactly circular and it may not be parallel to the bottom. Therefore it is necessary that the closure-applying device shall be constructed so as not only to function with a container made of thin glass, but also to accommodate variations in the size and shape of the container without the application of undue stresses thereto, so that the latter may be properly and securely sealed without breakage.

In accordance with this invention a device for applying closures to thin glass containers is provided, which will exert insufficient pressure to break the glass and yet will exert a force adequate to perfectly seal the containers, regardless of manufacturing inequalities in the size, shape, height and level of the rim or top portion of the containers. The sealing pressure of the device is determined by and limited to the pressure at which the initial contact between the closure and the device is made, so as not to disturb the initial seal, and the irregularities in the container are compensated for by a self-adjustment of the sealing mechanism both as regards level of the container rim and the circumferential shape, contour and size thereof.

The device of this invention includes a plunger arranged to be lifted bodily by the container to which the closure is to be affixed, and, in this movement, the plunger raises a liquid column contained therein, so as to actuate a valve and close a normal communication between the column and a liquid reservoir. The trapped liquid column, during subsequent movement of the plunger, causes the latter to bodily raise the appurtenant parts of the closing mechanism with it, the whole assembly meanwhile being free to shift laterally about a ball and socket joint to align itself accurately with the level of the rim of the container, regardless of its lack of parallelism with the bottom of the container. This aligning or levelling movement takes place during the take-up of a limited lost motion in the mechanism, and thereafter the bodily movement of the appurtenant parts stops although the plunger continues to move relatively thereto. During this continued movement the pressure on the plunger on the container is not increased because, at a predetermined pressure on the liquid column a second valve, interposed between the column and the reservoir, is opened to relieve the liquid pressure. Accordingly, the pressure on the fragile container is limited to the initial pressure on the closure and breakage is prevented and, also, the initial seal is not disturbed even though a very thin sheet metal closure is employed.

The relative movement between the plunger and the appurtenant parts releases a contractile spring ring, which resiliently engages the depending flange of the closure with a rolling pressure and conforms it to the contour of the closure. This contractile spring ring moves from around the lower end of the plunger, which is shaped so that the ring engages the closure at the level of the top of the container, reducing the closure at that point to the diameter of the container. Further relative movement between the spring ring and the closure flange conforms the remainder of the latter to the container. The spring ring is ground relatively flat on its inner surface to present a continuous surface to the closure and, because of its construction, is capable of great distortion to conform the closure to irregularities in size and shape of the periphery of the container. The spring ring is caused to conform the closure intimately to the contour of the container by the pressure of a conical ring which encircles the spring ring and is sufficiently flexible to accommodate the irregularities in the container shape. With this arrangement, the pressure of the spring ring on the closure is constant from the beginning to the end of the closing action and the container acts as a drawing punch and the contractile spring ring as the drawing die to shape the closure over the container. The pressure at which the second or relief valve opens may be adjusted to conform to the requirements of various operating conditions.

It will be seen that the container closing device of the invention has many advantages over those in current use in that it may be employed for closing thin glass containers as well as heavy containers with safety and a minimum of liability of breakage. The device embodies other additional novel features which will become apparent upon examination of the following description and the accompanying drawings, in which:—

Figure 1 is an elevation showing the complete device with a container and a closure in position to be applied by the device;

Figure 2 is an enlarged vertical section of the closure head, and a container and closure positioned relative thereto, before the closing operation;

Figure 3 is a similar view, at the end of the closing operation;

Figure 4 is a transverse section taken on line IV—IV of Figure 3;

Figure 5 is a transverse section taken on line V—V of Figure 3; and

Figure 6 is an enlarged view of a portion of the contractile spring ring which is an element of the closure head illustrated in Figures 2 and 3.

Referring to the drawings, and more particularly to Fig. 1, the device includes a base 1, upon which are mounted two side rods 2. A cross-bar 3 is mounted upon the side rods 2 and held in position by the nuts 4. Mounted on cross-bar 3 is a closure head, designated in general as A and described in more detail hereinafter.

A table 5 is mounted upon a rack 6. The table and the rack are adapted to be raised and lowered by the rotation of the gear 7 operated by the handle 8. Attached to the bottom of the rack is a stop 9 which engages the rack sleeve 9' on the base 1 to limit the upward movement of the rack and table. On the top of the table 5 is mounted a rubber pad 10. The container B, with the closure C placed in proper position thereon, is set on the rubber pad 10 and suitably positioned by means of the guide member 11, which is secured to and adjustable laterally on one of the side rods 2 by a set screw 12. When the closure C is to be applied to the container B, the handle 8 is rotated to raise the rack 6 and the table 10 and move the container and closure into engagement with the closure head A.

The closure head, shown more particularly in Figures 2 and 3, will now be described in detail:

Formed integrally with or attached to the cross-bar 3 is a threaded sleeve 13; a collar nut 14 is threaded on the sleeve 13. This sleeve and collar nut, being secured to the cross-bar 3, always remain in fixed position throughout the closing operation. The collar nut 14 is provided with an inwardly extending flange 14a on which rests a nut sleeve 15 and into which is threaded the flanged lower end of an elongated sleeve 16. Located within and secured by its upper end to the sleeve 16 is a tubular reservoir member 17, the lower end of which is closed by a wall 18 having one or more holes 19, and also through which is threaded a tubular valve seat 20. Formed on the bottom of valve seat 20 is a flange 21 having one or more holes 22. Carried by the flange 21 is an inverted cup leather 23 having an enlarged hole so as to leave a space 24 around the valve seat 20.

Threaded into the upper portion of reservoir member 17 is a nut 25 through which is threaded a filling tube 26 for filling the reservoir with a suitable liquid, such as oil. Abutting the bottom of the filling tube 26 is a spring guide 27. A coil spring 29 extends between the spring guide 27 and valve 28 seated on the valve seat 20, and holds the valve in closed position upon the seat. The pressure on the valve 28 may be regulated by adjusting the spring guide 27 by rotating the filling tube 26 within the nut 25. A cleaning hole 16a is provided in the upper end of sleeve 16.

Slidably axially within sleeve 16 is a plunger 31 having a tubular extension 31a enclosing reservoir member 17 and normally communicating therewith through the openings 19, 22, and 24, so that there is fluid in the chamber a. The valve 28 is hexagonal in shape (Fig. 4) so that the liquid may freely pass around it to and from chambers c and b.

Secured to the bottom of the plunger 31 is a plunger ring 32 which is adapted to be engaged by the top of the container and closure upon the upward movement of the same. The nut sleeve 15 is provided with an inwardly extending flange 33 upon which rests a conical ring 34. Resting upon the conical ring 34 is a contractile spring ring 35 which in turn supports a flexible conical ring 36. The contractile spring ring 35 is centreless ground, as shown at 35a (Fig. 6) to form a flat surface on the interior thereof, so that the ring may present a substantially continuous surface to the closure. An extension 37, which projects through slots 38 in the sleeve 16, rests upon the flexible conical ring 36. Supported by the extension 37 is a portion of a ball 39 adapted to cooperate with a socket 40 formed in the cross-bar 3. The ball and socket are so arranged that in the normal position of the closure head the ball and the socket are separated by about 1/32 an inch.

In operation of the device, the container B, with the closure C in proper position thereon, is placed upon the rubber pad 10 on the table 5 (Fig. 1) and properly aligned by means of the guide 11. The handle 8 is rotated and the table is raised by means of the gear 7 and rack 6. The closure C engages the plunger ring 32. Upon further upward movement of the container, the plunger 31 is raised thereby, the latter being free to move within the sleeve 16. This upward movement of the plunger 31 causes the liquid in chamber a to raise the cup leather 23 to close holes 19, thereby trapping the liquid in chamber a, so that it cannot escape except through valve 28, which, however, is held closed by spring 29.

Upon further upward movement of the container B, the force applied to the plunger 31 will be transmitted by the trapped liquid in chamber a to the reservoir member 17, so that the latter and plunger 31 move as a unit. Inasmuch as sleeve 16 is carried by the reservoir 17, it also moves, carrying with it the attached nut sleeve 15, conical ring 34 resting on the flange 33, spring ring 35, extension 37 and ball 39. At this time, i. e., when the container B is beginning to lift the entire closing mechanism, ball 39 seats in socket 40, meanwhile shifting laterally if necessary to allow for any unevenness in the height of the rim of the container B, so that the pressure on the closure C is uniform around its entire periphery.

After the contact of the ball 39 with the socket 40 the extension 37 and the flexible conical ring 36 are held in fixed position during the remainder of the sealing operation. Upon the further upward movement of the container, the conical ring 34 resting on the flange 33 will move the contractile spring 35 upwardly against the flexible conical ring 36. The contractile spring ring 35 will, therefore, tend to become smaller in diameter, as it is raised against the inclined surface of the flexible conical ring 36, and will be urged against the circumference of the plunger ring 32.

The spring 29 is adjusted to a tension such that when a predetermined pressure is placed upon the fluid in space $a$, the valve 28 will open and permit fluid to pass into the space $b$. This limits the pressure on the closure to that initially applied thereto, so that there is no increasing pressure which would disturb the initial seal between the rubber ring R and the rim of the container B, or distort the thin metal of which the closure C is made. The container, the plunger ring 32 and the plunger 31 accordingly move upwardly, while the sleeve 16 and the contractile spring ring 35 remain in fixed position.

It will, therefore, be apparent that the pressure being applied by the contractile spring ring against the circumference of the plunger ring 32 is always constant and will not be increased, for the reason that the contractile spring ring 35 is held in fixed position with reference to the flexible ring 36. Any tendency to raise the spring ring 35 relative to the conical ring 36 is relieved by the opening of valve 28.

As the container and the plunger ring 32 continue to move upward, the latter will move out of contact with the contractile spring ring 35, and the sides of the closure will be engaged by the ring and forced into contact with the container. The contractile ring 35 will therefore engage each container at the same point, irrespective of a variation in the height of individual containers. As the upward movement continues, the sides of the container will slide through the contractile spring ring 35 until the motion is stopped by the engagement of the nut 9 on the rack 6 by the stop 9'. (Fig. 1.)

It will, therefore, be apparent that the pressure exerted by the contractile spring ring 35 is at its maximum at the time of its initial contact with the closure and neither increases nor decreases during the closing operation. The closing operation is similar to a drawing action in which the container and closure act as the drawing punch and the contractile ring acts as the drawing die.

The flexibility of the conical ring 36 permits the application of a uniform pressure by the contractile spring ring 35 at all points in its circumference, irrespective of irregularities in the diameter of the top of the container.

Upon reversing the movement of the operating handle the container is lowered and due to the weight of the plunger 31, the latter follows the downward movement of the container. Upon the release of the pressure on the fluid entrapped in space $a$ the cup leather 23 moves away from the holes 19 and permits the fluid to return from the space $c$ into the space $a$. Since the fluid no longer supports any of the parts secured to the sleeve 16, the nut sleeve 15 and the contractile spring ring 35 return to their starting position.

The pressure at which the valve 28 is set to open may be varied by adjusting the pressure exerted by the spring 29, and in this way the pressure applied by the contractile spring ring 35 may be adjusted to accommodate containers of different physical properties.

The new closure device is adapted to be operated in connection with various shapes of containers. The sides of the container may be inclined as illustrated in the drawings or they may be vertical.

In the embodiment of the invention illustrated in the drawings, a construction is shown in which the container is moved into engagement with the closure head. It will be obvious that the container may remain in a fixed position and the closure head moved downwardly into engagement with the container and the closure, and I intend such a modification to be included within the scope of my invention. In the illustrated embodiment a hand operated closure device is shown, but the invention is intended to include devices operated by power.

It will be apparent that many detail changes and modifications may be made in the structure of the device without departing from the essence of the invention and all such changes and modifications are included within the invention as defined in the following claims.

I claim:

1. In a machine for applying a closure to a container, the combination of a support for the container, a contractile ring, a radially flexible cam ring engaged by said contractile ring, and means for relatively moving said support and cam ring for forcing the contractile ring against the closure to apply it to the container, said cam ring flexing radially to accommodate irregularities in the shape of the container.

2. In a machine for applying a closure to a container, the combination of a support for the container, a closure-applying head, means for relatively moving said support and head, a contractile ring on said head, means responsive to a predetermined initial pressure between said head and the container for forcing said ring against the closure to apply it to the container, and means responsive to a pressure between said head and container in excess of said predetermined pressure for disabling said last-named means.

3. In a machine for applying a closure to a container, a support for the container, a contractile ring, means for contracting said ring to apply a substantially constant pressure to the closure, said means being operated by relative movement between the container and ring in one direction, said pressure being wholly released upon relative movement in the other direction.

4. In a machine for applying a closure to a container, a support for the container, a closure-applying means, means for relatively moving the container and said closure-applying means into engagement, a hydraulic column interposed between said container and said closure-applying means, and means responsive to a predetermined pressure between said closure-applying means and the container for adjusting said hydraulic column to regulate the pressure of said closure-applying means on the container.

5. A closure-applying device, comprising a plunger adapted to be advanced by the container, a stationary cam ring, a contractile ring interposed between the cam ring and the closure, and a fluid column interposed between the plunger and the cam ring, whereby the movement of the plunger is transmitted by the column and the cam ring to the contractile ring for applying the closure.

6. A closure-applying device consisting of a plunger adapted to be operated by movement of the container, a contractile ring for forcing a closure into peripheral engagement with a container, a confined interposed fluid through which a predetermined pressure is transmitted from said plunger to said ring, and means responsive to a predetermined pressure of the fluid for releasing said fluid.

7. In a device for applying a closure to a container, a contractile ring having a substantially flat inner face for contracting the closure on the container, and means for applying the said flat face of the ring to the closure.

8. In a device for applying a closure to a container, a circular uniformly flexible member for applying pressure laterally to the sides of the closure, and a tapered flexible means with respect to which the circular member is relatively movable, for operating said pressure-applying means, whereby the same pressure will be applied at all points in the circumference of the container.

9. In a device for applying a closure to a container, a circular uniformly flexible member adapted to be contracted to a smaller diameter, a tapered flexible member with respect to which the circular member is relatively movable for contracting the circular member, and means to limit said contraction.

10. In a device for applying a closure to a container, a plunger, the cross-section of which is similar to that of the container to be closed, a circular member surrounding said plunger and adapted to be contracted, and means for contracting said circular member against said plunger, said plunger and said circular member being movable axially of said means by a container and closure whereby the circular member is contracted by said means against said closure.

11. In a device for applying a closure to a container, the combination of a closure-applying head, a contractile ring thereon, means for imparting relative movement between the container and the closure applying head, and hydraulically controlled means responsive to said movement for transmitting this movement to the contractile ring.

12. A machine for applying a closure to a container comprising a closure-applying head, and means to impart relative movement between the container and the closure-applying head, said head including a plunger adapted to be operated by said movement, a sleeve adapted to be moved with the plunger by means of an entrapped fluid, and a ring adapted to be contracted by the movement of said sleeve.

13. A machine for applying a closure to a container comprising a closure-applying head, and means to impart relative movement between the container and the closure-applying head, said head including a plunger adapted to be operated by said movement, a sleeve adapted to be moved with said plunger by means of an entrapped fluid, a flexible ring adapted to be held in a fixed position, a contractile ring adapted to be moved by said sleeve against said conical ring whereby said contractile ring is reduced in diameter against the closure.

14. A machine for applying a closure to a container comprising a closure applying head, and means to impart relative movement between the container and the closure-applying head, said head including a plunger adapted to be operated by said movement and containing a reservoir in which a fluid is entrapped, a sleeve adapted to be moved with the plunger by means of the entrapped fluid, a valve to release said fluid when the same is subjected to a predetermined pressure, a flexible conical ring adapted to be held in a fixed position, a contractile ring adapted to be moved by said sleeve against said conical ring whereby said contractile ring is reduced in diameter against the closure.

15. A machine for applying a closure to a container comprising a closure applying head, and means to impart relative movement between the container and the closure-applying head, said head including a plunger adapted to be operated by said movement and including a reservoir in which a fluid is entrapped, a sleeve adapted to be moved with said plunger by means of the entrapped fluid, a valve adapted to release said fluid, an adjustable spring to hold said valve closed and to permit said valve to open only when the fluid is subjected to a predetermined pressure, a flexible conical ring adapted to be held in a fixed position, a contractile ring adapted to be moved by said sleeve against said conical ring, whereby said contractile ring is reduced in diameter against the closure, and a ball and socket joint for mounting said conical and contractile ring whereby the same may be properly positioned with reference to containers of uneven height.

SAMUEL C. BOND.